United States Patent
Guarnieri et al.

(10) Patent No.: US 9,940,464 B2
(45) Date of Patent: *Apr. 10, 2018

(54) STATIC SECURITY ANALYSIS USING A HYBRID REPRESENTATION OF STRING VALUES

(71) Applicant: INTERNATIONAL BUSINESS MACHINES CORPORATION, Armonk, NY (US)

(72) Inventors: Salvatore A. Guarnieri, New York, NY (US); Marco Pistoia, Amawalk, NY (US); Omer Tripp, Har-Adar (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,908

(22) Filed: Jul. 26, 2016

(65) Prior Publication Data

US 2016/0335434 A1 Nov. 17, 2016

Related U.S. Application Data

(63) Continuation of application No. 13/611,201, filed on Sep. 12, 2012, now Pat. No. 9,424,423.

(51) Int. Cl.
| | |
|---|---|
| G06F 21/57 | (2013.01) |
| G06F 17/27 | (2006.01) |
| H04L 29/06 | (2006.01) |
| G06F 21/55 | (2013.01) |
| G06F 17/21 | (2006.01) |
| G06F 17/22 | (2006.01) |
| G06F 21/56 | (2013.01) |

(52) U.S. Cl.
CPC .......... *G06F 21/577* (2013.01); *G06F 17/211* (2013.01); *G06F 17/2211* (2013.01); *G06F 17/272* (2013.01); *G06F 21/552* (2013.01); *G06F 21/554* (2013.01); *G06F 21/563* (2013.01); *H04L 63/1408* (2013.01); *H04L 63/1433* (2013.01); *G06F 17/27* (2013.01); *G06F 17/2765* (2013.01); *H04L 63/168* (2013.01)

(58) Field of Classification Search
CPC ..... G06F 17/2235; G06F 21/556; G06F 17/27
See application file for complete search history.

(56) References Cited

U.S. PATENT DOCUMENTS

| | | |
|---|---|---|
| 7,530,107 B1 | 5/2009 | Ono et al. |
| 8,799,874 B2 | 8/2014 | Pistoia et al. |
| 2009/0204955 A1 | 8/2009 | Su et al. |
| 2010/0223599 A1 | 9/2010 | Ghosh et al. |

(Continued)

*Primary Examiner* — Lewis A Bullock, Jr.
*Assistant Examiner* — Tina Huynh
(74) *Attorney, Agent, or Firm* — Tutunjian & Bitetto, P.C.; Daniel P. Morris

(57) ABSTRACT

Methods for creating a hybrid string representation include determining string components from input string information that may be represented concretely by comparing the one or more components to a set of known concretizations using a processor. The set of known concretizations includes string configurations that cannot be interfered with by an attacker. All string components that could not be represented concretely are abstracted. A hybrid string representation is created that includes at least one concrete string component and at least one abstracted string component.

9 Claims, 3 Drawing Sheets

(56) References Cited

U.S. PATENT DOCUMENTS

2010/0250250 A1 9/2010 Wiggs
2011/0088023 A1 4/2011 Haviv et al.
2011/0145785 A1 6/2011 Centonze et al.

STATIC SECURITY ANALYSIS USING A HYBRID REPRESENTATION OF STRING VALUES

BACKGROUND

Technical Field

The present invention relates to static security analysis and, more particularly, to representing source statements as hybrids of concrete and abstract representation.

Description of the Related Art

Static security analysis typically takes the form of taint analysis, where the analysis is parameterized by a set of security rules, each rule being a triple <Src,San,Snk>, where Src denotes source statements that read untrusted user inputs, San denotes downgrader statements that endorse untrusted data by validating and/or sanitizing it, and Snk denotes sink statements which perform security-sensitive operations. Given a security rule R, any flow from a source in $Src_R$ to a sink in $Snk_R$ that doesn't pass through a downgrader from $San_R$ comprises a potential vulnerability. This reduces security analysis to a graph reachability problem.

However, one source of imprecision in taint analysis comes from the fact that untrusted values are not represented explicitly. Instead, vulnerabilities are reported based on data flow extending from the source to the sink. This has been a reasonable compromise, given that tracking fully concrete values during static analysis of a program yields an unbounded state space. Thus the static verifier is not guaranteed to converge on a fixpoint solution in finite time.

To increase precision, a family of algorithms collectively known as "string analysis" has been developed. In these algorithms, string values are modeled either using regular representations or a context-free language or logical formulae (e.g., in monadic second-order logic). None of these approaches has been shown to scale beyond a few lines of code due to the inherent computational complexity of representing string variables in these forms.

SUMMARY

A method for creating a hybrid string representation includes determining string components from input string information that may be represented concretely by comparing the one or more components to a set of known concretizations using a processor. The set of known concretizations includes string configurations that cannot be interfered with by an attacker. All string components that could not be represented concretely are abstracted. A hybrid string representation is created that includes at least one concrete string component and at least one abstracted string component.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
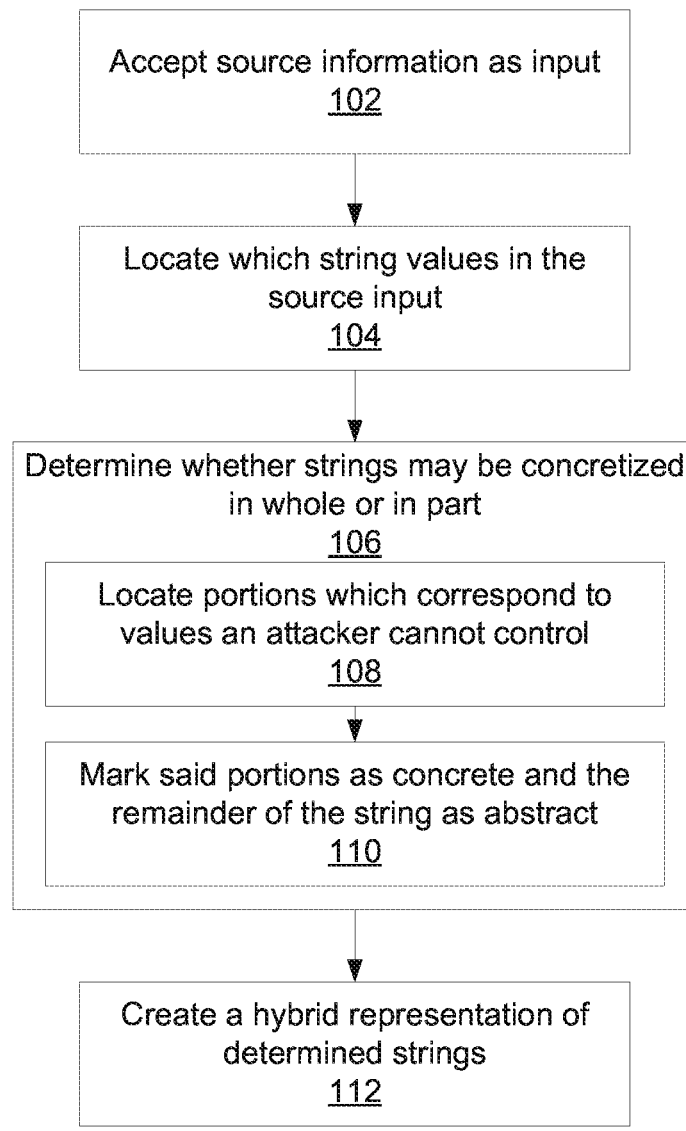
FIG. 1 is a block/flow diagram of a method for creating hybrid string representations according to the present principles.

The present principles provide a form of static security analysis where state abstractions, and string abstractions in particular, are hybrids with portions that are fully concrete and other portions that are abstract. This form of analysis is informed by two observations. First, one can make sound use of concrete information, such as the concrete URL where JavaScript® code is found, session attributes fixed by the server side of the web application, variables that take a value from external configuration files, etc. Second, instead of applying a uniform abstraction to an entire concrete state, one can leverage concrete information to yield significant accuracy improvements.

Below is a set of example code that shows one situation where traditional taint analysis will provide a false-positive:

```
var qsParm = new Array( );
var query = window.location.search.substring(1);
if (!query == '') {
    var parms = query.split('&');
    for (var i=0; i<parms.length; i++) {
        var pos = parms[i].indexOf('=');
        if(pos > 0) {
            var key = parms[i].substring(0,pos);
            var val = parms[i].substring(pos+1);
            qsParm[key] = val; } }
    window.location.href =
'ProcessCalendarRequest.asp?eventId='+qsParm['eventId']+
'&OvrridePage='+qsParm['OverridePage']+'&checkJS=true'; }
```

This code, which is non-trivial to analyze manually, would be flagged as vulnerable by a standard static security analysis. This is because the code admits a flow from a URL search string (assigned to variable "query") to the next URL the web browser is instructed to redirect to (the "href" field of "windows.location"). However, careful analysis of this example indicates that it is, in fact, safe. An attacker cannot control the location to which the client JavaScript® navigates because this location is not determined—not even in part—by the parameters set by the attacker.

Importantly, this conclusion can be arrived at fully automatically. If the "query" variable is assigned a concrete value, then tracking this value (and the transformations it undergoes up to the point where it flows into href) reveals that the code is safe. There are several possible ways to set a concrete value for "query": (i) based on a specification by the user, (ii) based on dynamic information (either black-box or glass-box testing of the subject application) by accessing the URL where the program (or its enclosing web page) was found, (iii) based on static deployment information, where the URL is static and can be resolved directly from the configuration file of a web application, (iv) via a browser plugin that associates analyzable HTML pages with a concrete URL and provides that information for static analysis, etc.

The form of static analysis described by the present principles highly potent in suppressing false reports (as demonstrated for the above example). Tests have shown a reduction in false reports by more than 80%. Since the analysis is fully sound, there is no regression in true positives, which renders the overall accuracy improvement highly significant.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a method for string representation is shown. Block 102 accepts the source for a program or webpage as input. This source input may be entirely program code or may represent a combination of markup and program code, as in the case of a page with embedded JavaScript®. It should be recognized that the above is not intended to be limiting and that any appropriate input may be used. Block 104 parses the source input to locate strings in a static analysis. For example, block 104 may find statements that access the page URL by accessing, e.g., document.location.

Block 106 determines whether each string may be concretized, whether in whole or in part. To accomplish this, block 108 locates strings or portions of strings which correspond to values that an attacker cannot control. In the above-discussed example, a document's location is fixed—there is nothing that an attacker can do to disrupt that input. Furthermore, because the value of this string is fixed and does not in any way depend on user input, representing the value concretely does not increase the size of the representation. In contrast, portions of a string which may be specified by a user are represented as abstract regular expressions, because a concrete expansion of such terms would have to be effectively unbounded to account for every possible input. It should be recognized that the determination of whether a string or portion of string may be made concrete can be performed by consulting a table of known concretizable values or may be determined automatically. For example, if analysis can bind between an external configuration file and string variables within the program, e.g., by being aware of the framework APIs used to retrieve the values from the files, a string may be concretized without prior specification.

Block 110 marks the located concrete portions of the string as being concrete and marks the remainder as being abstract. Block 112 creates a hybrid representation of the determined strings by concatenating the explicit form of the concrete portion of the string with appropriate regular expressions to account for the remainder of the string.

Consider the string, "http://www.site.com/search?q1=input1&q2=input2". Part of this string may be left concrete—the website path, "http://www.site.com/search", is fixed and cannot be altered by an attacker. The remaining portion of the string, however, "q1=input1&q2=input2", represents values that may be specified by a user or disrupted by an attacker. This portion of the string can be represented abstractly by one or more regular expressions. Thus, the hybrid representation of the string may be formed as, "http://www.site.com/search.*", or as, "http://www.site.com/search\?1=.*&q2=.*", depending on how much information regarding the structure of the inputs is available. The latter example may not be sound, because an attacker can select parameter names, but the abstraction may be included if it is one of several seeding values used by the analysis. A further example would be, "String strutsConfigFile=servlet.getServletContext( ).getResource("/WEB-INF/struts-config.xml").toString( );" from the Struts framework in Java. The attacker cannot modify the configuration settings of a deployed web application (i.e., binding it to another configuration file), and so the variable strutsConfigFile can be safely resolved to a concrete value.

Although the present principles are described with particular attention to the application of static security analysis, it should be recognized that they may be used in many different contexts. For example, hybrid string representations may be employed to optimize database accesses by modeling structured query language (SQL) queries, such that the type of primary SQL action becomes known to the compiler. Further application may be found in applying compile-time checking to reflective code statements by approximating the meaning of the reflective statement. The present principles may be applied more generally in any form of static analysis where string parsing is used.

Figure 2:
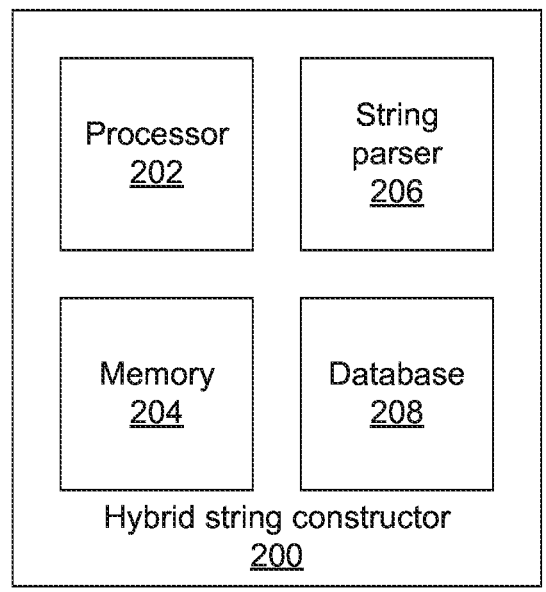
FIG. 2 is a diagram of a hybrid string constructor according to the present principles.

Referring now to FIG. 2, a diagram of a string parsing/representation system is shown. A hybrid string constructor 200 includes a processor 202 and memory 204. A string parser 206 accepts a string as input from, e.g., memory 204 or from an external source, and uses processor 202 to determine which parts of the string (if any) may be represented concretely and which should be rendered abstractly. To accomplish this, string parser 206 accesses database 208 to find particular patterns or string types which may safely be represented as concrete strings. The hybrid string constructor 200 then uses processor 202 to replace the abstract portions of the string with, e.g., regular expressions or any other suitable form of string abstraction.

Figure 3:
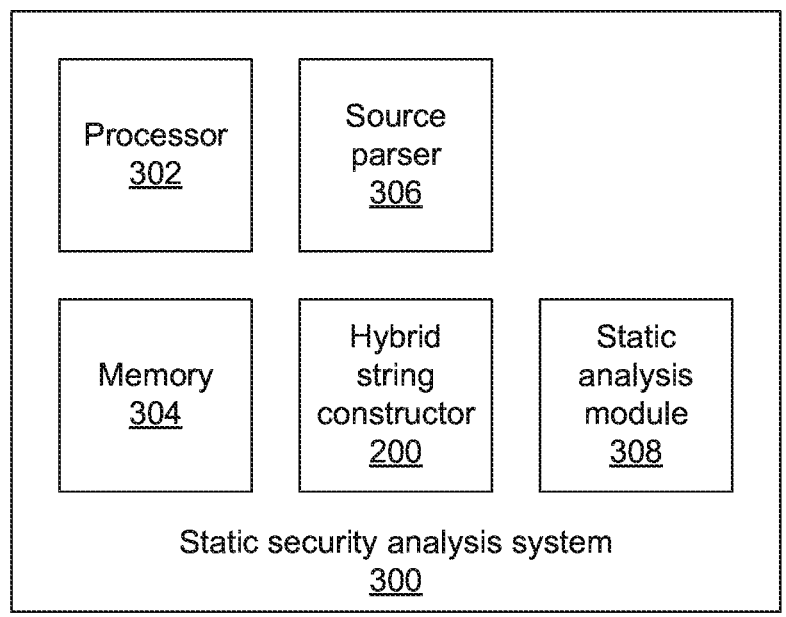
FIG. 3 is a diagram of a static security analysis system according to the present principles.

Referring now to FIG. 3, the hybrid string constructor is shown as part of a larger static analysis system 300. A source parser 306 uses processor 302 to find strings within a set of source code stored in memory 304. The source parser 306 forwards the strings to hybrid string constructor 200, which creates hybrid concrete/abstract representations of the strings. These hybrid representations are then processed at the static analysis module 308, which tracks transformations performed on the strings to determine whether the strings pose a security risk.

Figure 4:
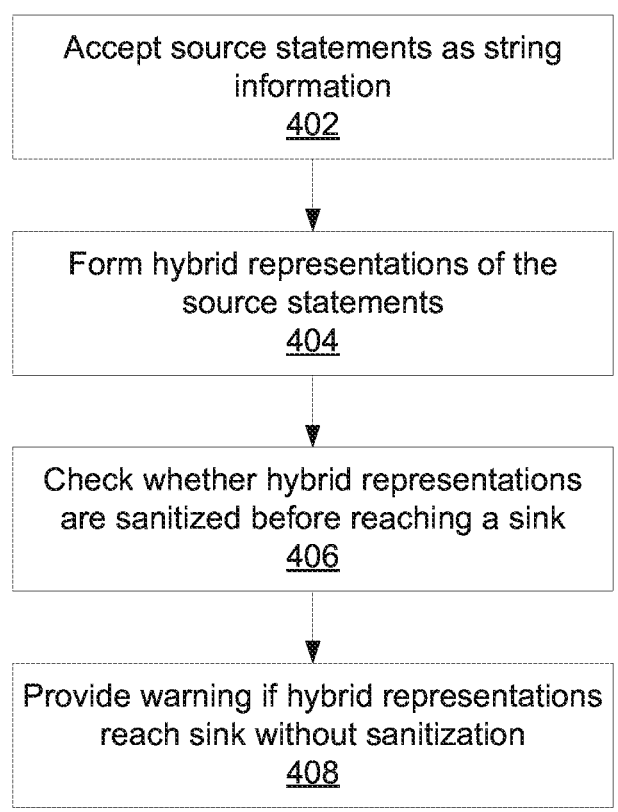
FIG. 4 is a block/flow diagram of static security analysis using hybrid string representations of source statements according to the present principles.

Referring now to FIG. 4, a method of using the present principles for abstract analysis is shown. Block 402 reads in, e.g., program code source statements as string information. This may be in the form of, e.g., source code that is being used to analyze the program's security. Block 404 forms hybrid representations of the source statements as set forth above. These hybrid representations include concrete string components concatenated with abstracted string components represented as, e.g., regular expressions.

Block 406 checks whether the hybrid representations have been sanitized before they reach a sink. In such a check, concrete portions of a hybrid representations need not be sanitized, because there is no way that an attacker can affect their contents. On the other hand, abstracted components should be sanitized to prevent potential attacks. If block 406 finds unsanitized abstracted components, then block 408 provides an alert that the program includes a potential vulnerability. By using the hybrid representations provided by the present principles, the number of false-positive vulnerability alarms is substantially reduced.

Having described preferred embodiments of a system and method for creating static security analysis using a hybrid representation of string values (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for creating a hybrid string representation, comprising:
   determining string components from input string information that may be represented concretely by comparing the one or more components to a set of known concretizations using a processor, wherein the set of known concretizations includes string configurations that cannot be interfered with by an attacker;
   abstracting all string components that could not be represented concretely;

creating a hybrid string representation that includes at least one concrete string component and at least one abstracted string component; and performing a taint analysis on the hybrid string representation to locate potential vulnerabilities.

2. The method of claim 1, wherein the set of known concretizations includes strings that refer to a page's uniform resource location.

3. The method of claim 2, wherein the set of known concretizations includes strings that include the JavaScript® object "document.location".

4. The method of claim 1, further comprising binding between an external configuration file and string variables to automatically concretize a string component.

5. The method of claim 4, wherein said binding comprises monitoring framework interfaces used to retrieve string values from the configuration files.

6. The method of claim 1, wherein abstracting string components comprises replacing a string component with one or more regular expressions.

7. The method of claim 1, wherein creating a hybrid string representation comprises concatenating said at least one concrete string component and said at least one abstracted string component.

8. The method of claim 1, wherein the input string information comprises a combination of program code and markup code.

9. A non-transitory computer readable storage medium comprising a computer readable program for creating a hybrid string representation, wherein the computer readable program when executed on a computer causes the computer to perform the steps of:

determining string components from input string information that may be represented concretely by comparing the one or more components to a set of known concretizations, wherein the set of known concretizations includes string configurations that cannot be interfered with by an attacker;

abstracting all string components that could not be represented concretely; and creating a hybrid string representation that includes at least one concrete string component and at least one abstracted string component; and performing a taint analysis on the hybrid string representation to locate potential vulnerabilities.

* * * * *